3,118,864
PROCESS OF POLYMERIZING CONJUGATED ALKADIENES
Ivan Maxwell Robinson and Ralph Courtenay Schreyer, Wilmington, Del., assignors to E. I. du Pont de Nemours and Company, Wilmington, Del., a corporation of Delaware
No Drawing. Filed Nov. 22, 1954, Ser. No. 470,505
2 Claims. (Cl. 260—92.3)

This invention relates to a process for preparing linear polymers of conjugated alkadienes, and more particularly, it relates to the preparation of homopolymers and copolymers of butadiene, isoprene, and chloroprene by a novel process.

It is, of course, widely known that conjugated diolefins, such as butadiene, isoprene, and chloroprene, may be polymerized into elastomeric products by methods employing metallic sodium catalysts, free-radical catalysts, or sodium alkyl catalysts, and furthermore, it is known that the polymerization products may be crosslinked. In copending application Serial No. 462,608, filed by Baxter and Robinson on October 15, 1954, there is disclosed and claimed the preparation of novel copolymers of butadiene and ethylene.

So far as is known, the process of this invention has never been applied to the preparation of copolymers of isoprene/ethylene or of chloroprene/ethylene. Furthermore, the present process is a novel method of polymerizing conjugated alkadienes into high molecular weight polymeric products, without resorting to the additional prior art step of cross-linking to increase the molecular weight.

It is an object of this invention to prepare polymers of conjugated alkadienes such as isoprene or chloroprene. It is another object of this invention to provide a novel process in which high molecular weight linear polymers or copolymers of isoprene and chloroprene may be prepared. From the detailed description of this invention other objects will become apparent to those skilled in the art.

The above objects are accomplished in accordance with the process of this invention by subjecting a conjugated alkadiene, such as isoprene, to polymerization conditions, in the presence of a coordination catalyst, as will be more fully explained hereinbelow. A preferred mode of employing the process of this invention is to subject a conjugated alkadiene such as isoprene or chloroprene, with or without an added ethylenically unsaturated monomer, to reaction conditions of 1 to 200 atmospheres' pressure and 0° to 300° C. in the presence of titanium tetrachloride and lithium aluminum tetraalkyl, the lithium compound being present in sufficient amount to reduce the valence of the titanium, at least in part, to two.

The term "coordination catalyst" wherever used in this description and in the appended claims is defined as a catalyst formed by the reaction of a polyvalent metal compound, specifically defined below, with a reducing agent, also specifically defined below, the reducing agent being present in sufficient amount to reduce the valence state of said polyvalent metal, at least in part, to less than 3. The polyvalent metal compounds are selected from the group consisting of those compounds having the formula $M_nX_m$ and $M_n(OR)_m$ wherein M is an element from the group consisting of Ti, Zr, Ce, V, Nb, Ta, Cr, Mo, and W, X is a halide R is selected from the group consisting of monovalent hydrocarbon radicals and monovalent substituted hydrocarbon radicals, and $n$ and $m$ are integers. The reducing agent in the above definition is an organometallic compound having at least one metal-hydocarbon bond.

Specific examples of the polyvalent metal halides and esters included in the above definition are titanium tetrachloride, titanium tetrafluoride, zirconium tetrachloride, niobium pentachloride, vanadium tetrachloride, tantalum pentabromide, cerium trichloride, molybdenum pentachloride, tungsten hexachloride, tetra(2-ethyl hexyl)-titanate, tetrapropyl titanate, titanium oleate, octylene glycol titanate, triethanolamine titanate, tetraethyl zirconate, tetra(chloroethyl) zirconate and the like.

Specific examples of the reducing agents included in the above definition are phenyl magnesium bromide, lithium aluminum tetraalkyl, dimethyl cadmium, and the like.

The exact composition of the "coordination catalyst" when it is in its active state, capable of polymerizing ethylenically unsaturated compounds is not known. However, it is known that when one of these polyvalent metal compounds is mixed with a sufficient amount of an organometallic reducing agent, such as lithium aluminum tetra alkyl, to reduce the valence of the polyvalent metal to less than 3, and preferably to 2, the polyvalent metal composition becomes a highly active polymerization catalyst. In this highly active state the polyvalent metal composition is capable of forming coordination complexes with ethylenically unsaturated monomers causing them to polymerize to a high molecular weight linear polymer.

The reaction conditions of the polymerization process are extremely mild. Pressures of 1 to 200 atmospheres are normally employed. Temperatures of 0° to 300° C. are preferred. The most satisfactory results are obtained when the polymerization medium is free of moisture or other sources of hydroxyl groups, free of oxygen, and free of ketones, esters, or aldehydes.

The invention is illustrated by the following examples.

*Example 1.*—Into a 500 cc. 3-neck flask there was placed 50 cc. of lithium aluminum tetrabutyl (prepared as described below), 0.95 gram of titanium tetrachloride, and 100 cc. of cyclohexane, the mixture immediately turning black. The mixture was stirred under a nitrogen blanket as 34 grams of isoprene dissolved in 50 cc. of cyclohexane was added to the mixture over a 5 minute period. The temperature of the mixture was 25° C. to 27° C. for the first 15 minutes, then it reached 48° C. during the next ½ hour, and finally the mixture was allowed to cool to 32° C. during the next 1¼ hours. The product mixture was poured into methanol causing sticky dark polymeric substance to separate. This substance was dissolved in cold benzene, filtered and reprecipitated with methanol. There was recovered 0.25 gram of a white, sticky polyisoprene.

The lithium aluminum tetrabutyl was prepared by mixing 5 grams of lithium aluminum hydride with 50 grams of butene-1 in 250 cc. of cyclohexane (purified and dried by passing it through silica gel and storing it over lithium aluminum hydride). The mixture is placed in a shaker tube at 120° to 125° C. under autogenous pressure for 1 hour. The supernatant liquid from this composition was employed as the lithium aluminum tetrabutyl mentioned above.

*Example 2.*—The procedure of Example 1 was duplicated using redistilled isoprene as the monomer. The reaction temperature changed from 28° C. at the beginning of the reaction to 40° C. after 10 minutes, and finally levelled off at 35° to 37° C. during the last two hours of the three hour reaction period. The contents were poured into a mixture of methanol and a small amount of HCl, causing the precipitation of a soft sticky substance. After reprecipitation from cyclohexane, there was recovered 1.2 grams of dry rubbery polymer.

*Example 3.*—Into a 325 cc. stainless steel shaker tube there was placed 50 cc. of lithium aluminum tetrabutyl, 0.95 gram of titanium tetrachloride and 100 cc. of cyclohexane as described in Example 1. There was then added to the tube 17 grams of isoprene and the tube was pressured with 500 p.s.i. of ethylene. The tube was shaken for 2 hours at 100° C. and 500 p.s.i. pressure. The contents of the tube were removed and worked up as described in Example 1. There was recovered 6.5 grams of a sticky copolymer of ethylene and isoprene. A film was pressed at 200° C. and annealed at 100° C. for 10 minutes. The product was clear in appearance, had good snap, and was cold drawable. Infra red analysis indicated the copolymer contained a major amount of ethylene and a minor amount of isoprene.

*Example 4.*—Into a 250 cc. Erlenmeyer flask there were placed lithium aluminum tetrabutyl, titanium tetrachloride and cyclohexane in amounts equal to one-half of those specified in Example 1. Chloroprene, which was distilled from a commercial grade containing 50% chloroprene in xylene, was introduced into the flask slowly under nitrogen until a total of 36 grams had been added. Polymeric particles formed continuously and the reaction appeared to be complete within 10 minutes after the chloroprene addition. The reaction mixture allowed to stand for an additional 20 minutes, after which the reaction mixture was poured into methanol containing a small amount of HCl. The polymer product was worked up as described in Example 1, yielding 2.3 grams of a rubbery polymer of chloroprene. A film was pressed at 200° C., cut, and repressed on itself with good flow and good fusion, indicating that there was no crosslinking. The film was tough and rubbery and insoluble in boiling xylene.

*Example 5.*—A mixture of 25 cc. of lithium aluminum tetrabutyl, 0.95 gram of titanium tetrachloride, and 50 cc. of cyclohexane was prepared in a 500 cc. 3-neck flask fitted with a stirrer, a condenser, and a gas inlet tube. After the mixture turned black, ethylene was bubbled through the stirred contents of the flask at a rate sufficient to insure saturation, and simultaneously, 19.5 grams of chloroprene was added slowly over a 20 minute period. The reaction temperature rose to 55° C. and then dropped. The ethylene feed stream was shut off and the reaction mixture was heated to 70° C. for 15 minutes. Polymeric particles formed in suspension and gradually changed from black to deep brown over the total reaction period of 35 minutes. The polymer was worked up in the manner described in Example 1, yielding 5.5 grams of dried product. Films pressed at 200° C. were tough and cold drawable. Infra red analysis indicated that the polymer consisted of a major amount of ethylene and a minor amount of chloroprene.

*Example 6.*—A mixture of 0.015 mole of lithium aluminum tetrabutyl (prepared as described in Example 1), 0.01 mole of titanium tetrachloride, and 100 ml. of cyclohexane was prepared in a flask and stirred until it turned black. The black mixture was then poured into a 325 cc. shaker tube containing 27 grams of butadiene. The tube was sealed and allowed to stand for 2 hours at room temperature and autogenous pressure. After this reaction period the contents of the tube were mixed under nitrogen with 200 cc. of methanol with a high speed stirring mechanism, and then filtered under nitrogen. The mixing and filtering was repeated twice again with fresh methanol. The filtered product was dissolved in carbon disulfide, reprecipitated with methanol and dried in a vacuum oven, yielding 13 grams of an ivory colored, rubbery polybutadiene.

*Example 7.*—Titanium tetrachloride (4 grams, 0.02 mole) was dissolved in 200 cc. of cyclohexane and 26 cc. of a 3 M ethereal solution of phenyl magnesium bromide (0.08 mole) was added rapidly. The mixture was shaken vigorously for 10 minutes, filtered under nitrogen, and the solid dried at room temperature (1.0 mm.) to a pyrophoric, black powder. Three grams of this black powder dissolved in 100 cc. of cyclohexane was placed in a 325 cc. shaker tube containing 25 grams of butadiene. The tube was sealed and shaken for 2 hours at room temperature and autogenous pressure. The contents of the tube were washed with methanol and then with acetone and finally, filtered and dried under vacuum. The product was 4 grams of a rubbery polybutadiene, which was soluble in cyclohexane and in benzene. Infrared analysis indicated that both 1,2-addition and 1,4-addition had taken place. Upon heating or upon standing in air for a period of time, the polybutadiene became insoluble, indicating cross-linking.

The polymeric products of the process of this invention are homopolymers and copolymers of conjugated alkadienes in general. These conjugated alkadienes include butadiene, isoprene, 2,3-dimethyl butadiene, chloroprene, bromoprene, fluoroprene, and the like. Thus homopolymers of any of these alkadienes are included within the scope of this invention.

Copolymers which are intended to be made by the process of this invention are ethylene/isoprene, ethylene/chloroprene, ethylene/bromoprene, ethylene/fluoroprene, and the like.

The products of the process of this invention are linear high molecular weight polymers. The polymer chain may be formed by 1,2-addition, 3,4-addition, or 1,4-addition. These products are rubbery and may be cross-linked by heating, by treatment with acid catalysts, by treatment with free-radical catalysts, or they may be vulcanized by known methods employing sulfur or sulfur dioxide and a suitable catalyst. The products of this invention may be molded into various articles including films and funicular structures, and articles generally produced from the known rubberlike materials.

We claim:

1. The process of preparing a linear homopolymer of a conjugated alkadiene comprising subjecting a conjugated alkadiene selected from the group consisting of butadiene, isoprene, and chloroprene, to a pressure of 1–200 atmospheres and a temperature of 0°–300° C. in the presence of a catalyst which is the reaction product of a polyvalent metal compound and sufficient amount of a reducing agent to reduce the valence of said polyvalent metal to less than 3, said polyvalent metal compound being a member of the group consisting of esters and halides of titanium, zirconium, cerium, vanadium, niobium, tantalum, chromium, molybdenum, and tungsten, and said reducing agent being an organometallic compound having at least one metal-hydrocarbon bond, and recovering a linear homopolymer of said conjugated alkadiene.

2. The process of preparing a linear homopolymeric product from a conjugated alkadiene comprising subjecting to reaction conditions of 1 to 200 atmospheres and 0° to 300° C., a conjugated alkadiene selected from the group consisting of butadiene, isoprene, and chloroprene in the presence of titanium tetrachloride and an organometallic reducing agent having at least one metal-hydrocarbon bond, said reducing agent being present in sufficient amount to reduce the valence of said titanium, at least in part, to two.

References Cited in the file of this patent

UNITED STATES PATENTS

| | | |
|---|---|---|
| 2,085,535 | Langedijk | June 29, 1937 |
| 2,122,826 | Van Peski | July 5, 1938 |
| 2,200,429 | Perrin et al. | May 14, 1940 |
| 2,366,219 | Soday | Jan. 2, 1945 |
| 2,371,849 | Schulze et al. | Mar. 20, 1945 |
| 2,395,778 | Breck et al. | Feb. 26, 1946 |
| 2,396,920 | Larson | Mar. 19, 1946 |
| 2,440,498 | Young et al. | Apr. 27, 1948 |
| 2,559,062 | Dornte | July 3, 1951 |
| 2,721,189 | Anderson et al. | Oct. 18, 1955 |
| 2,762,790 | Greene | Sept. 11, 1956 |